April 29, 1969     O. WOSERAU ET AL     3,440,954

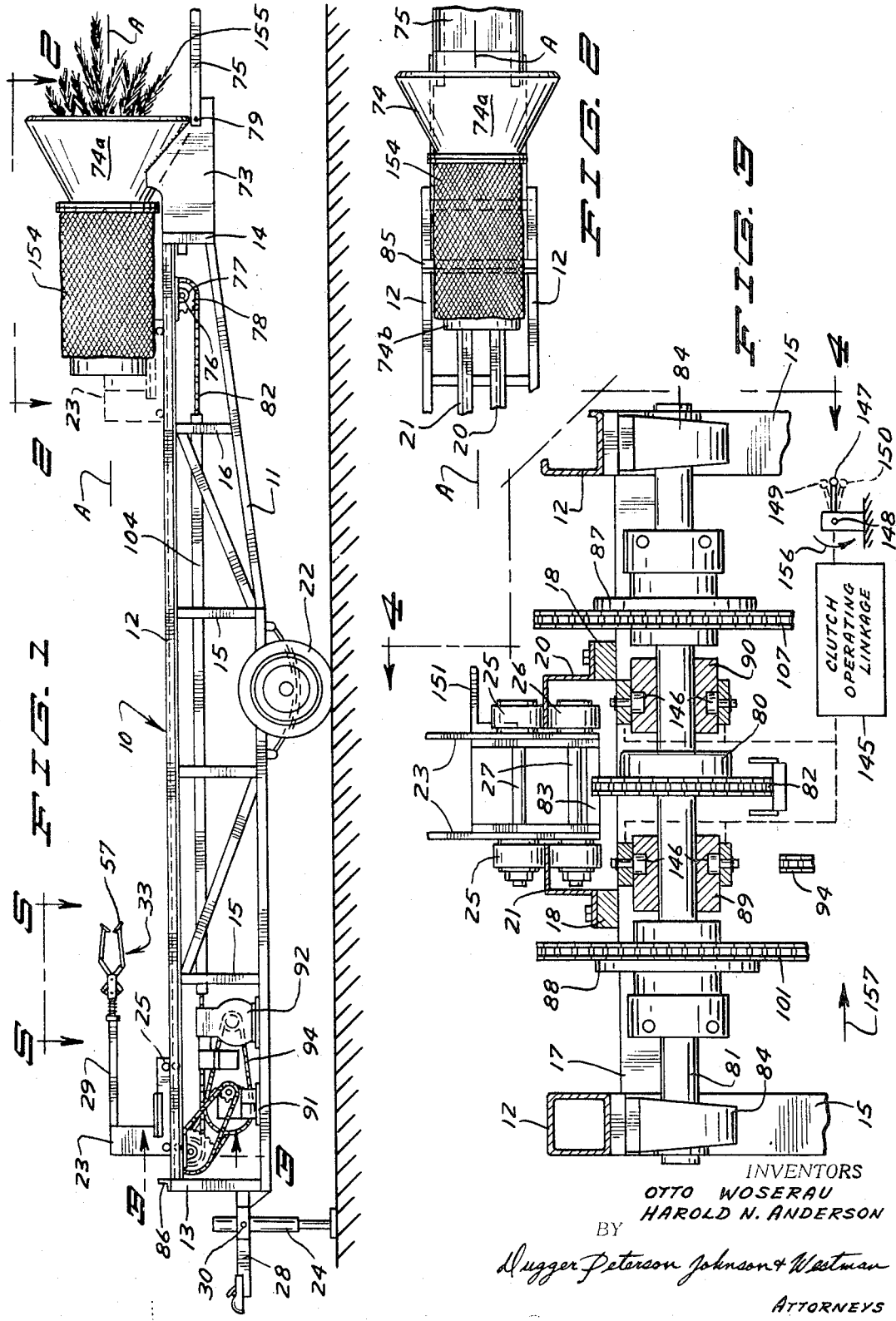

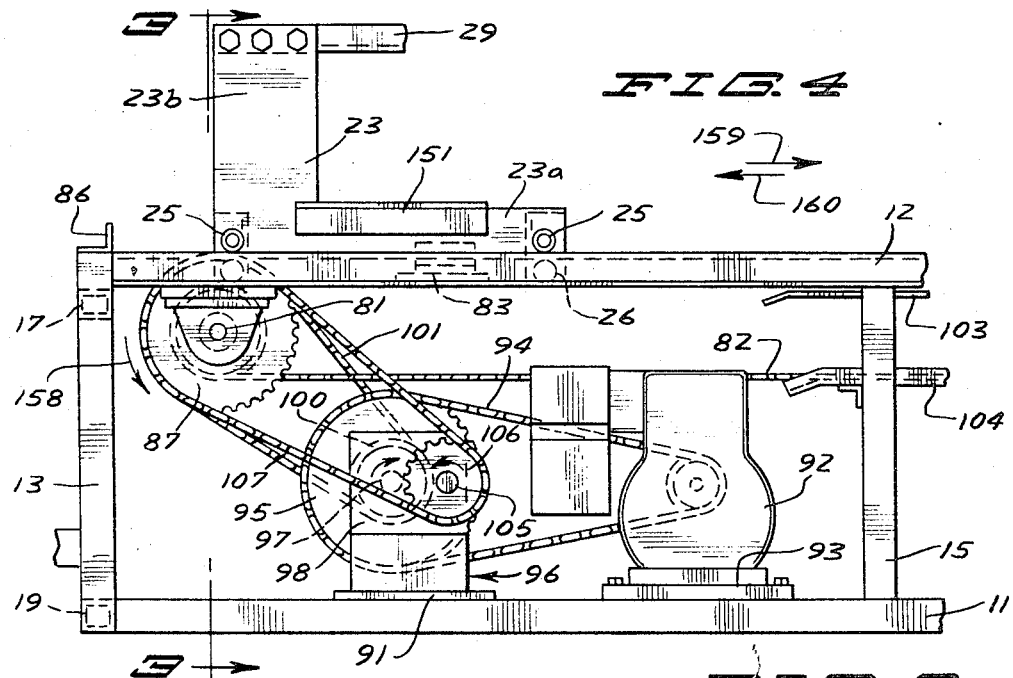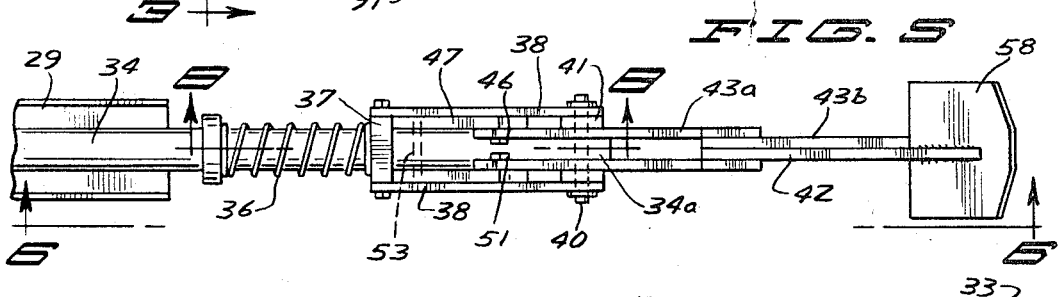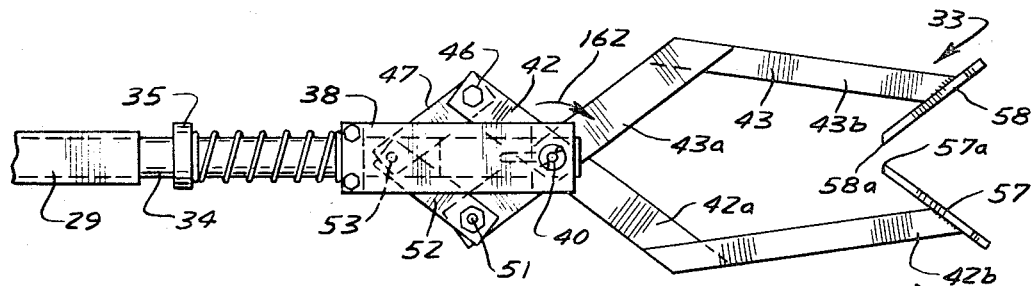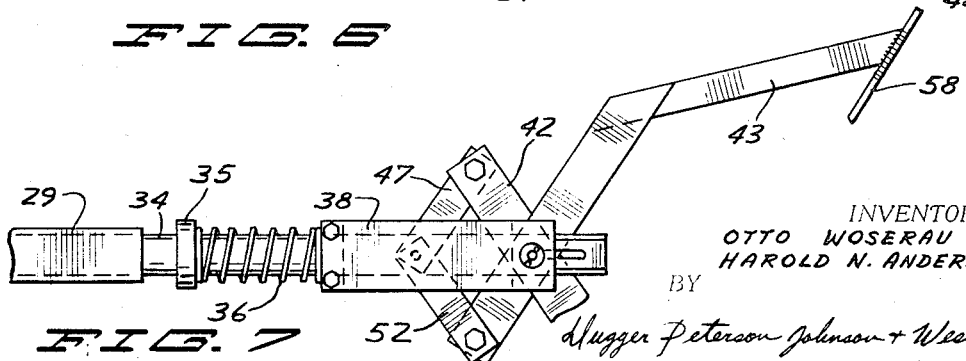

CHRISTMAS TREE LOADER APPARATUS

Filed Oct. 31, 1967     Sheet 3 of 3

INVENTOR.
OTTO WOSERAU
HAROLD N. ANDERSON
BY

ATTORNEYS

United States Patent Office 3,440,954
Patented Apr. 29, 1969

---

3,440,954
CHRISTMAS TREE LOADER APPARATUS
Otto Woserau, Minneapolis, and Harold N. Anderson, Golden Valley, Minn., assignors to Bemis Company, Inc., Minneapolis, Minn., a corporation of Missouri
Filed Oct. 31, 1967, Ser. No. 679,485
Int. Cl. B30b 5/00, 15/02; B65b 63/02
U.S. Cl. 100—144                     15 Claims

ABSTRACT OF THE DISCLOSURE

Trailer mounted apparatus for loading a Christmas tree into plastic netting including gripper mechanism for pulling the tree through a funnel to radially compress the branches of the tree, said gripper mechanism being mounted on a carriage for longitudinal movement. The gripper mechanism includes a pair of sharp edged jaws that are forced apart by the tree trunk as the carriage is moved toward and adjacent the funnel, the jaws being resiliently urged through jaw mounting mechanism to bite into the tree trunk as the carriage is retracted. Clutch mechanism is provided for applying drive to the carriage in either longitudinal direction.

CROSS REFERENCE TO RELATED APPLICATION

This application is directed to improvements in the apparatus of our copending application Ser. No. 636,894, filed May 8, 1967, which is incorporated herein by reference.

BACKGROUND OF THE INVENTION

The invention is directed to apparatus for radially compressing the branches of a Christmas tree and packaging the tree in plastic netting or similar material to retain the tree in a compressed condition. Prior art Christmas tree loading apparatus includes a funnel through which a Christmas tree is drawn by a cable mounted on a reel remote from the funnel. However, each time, prior to pulling another tree through the funnel, the operator has to pull the cable to the funnel which slows down the operation and involves hard manual labor. The prior art also includes mounting a number of endless conveyors to provide a somewhat closed type of housing with the inner runs of the conveyors converging to radially compress the tree branches as it is moved therethrough. At least some prior art Christmas tree loaders have been provided with mechanism to wind twine in a helical manner about the tree as the tree is moved forward to retain the tree in a branch compressed condition. However, this requires tying the twine to each end of the tree; and after the twine is tied, it can slip whereby it is no longer tightly around the tree. With the apparatus of our aforementioned copending application, occasionally the gripper mechanism did not tightly grip the tree trunk. On wet or icy tree trunks there would be some slippage. To provide a relatively simple, high speed Christmas tree loader that overcomes problems of the aforementioned nature, as well as others, this invention has been made.

SUMMARY OF THE INVENTION

Apparatus for loading a Christmas tree that includes gripping mechanism that is drivenly translated between a position adjacent a funnel and a remote position, said gripping mechanism including a pair of sharp edged jaws that are forced apart by the tree trunk as the jaws are moved toward the tree trunk and resiliently urged to force the jaw edges into the tree trunk as the jaws are moved away from the funnel.

One of the objects of this invention is to provide new and novel tree trunk gripper jaw mechanism on a Christmas tree loader wherein the jaws are forced apart by the tree trunk as the jaws move into abutting engagement with the tree trunk. In furtherance of the aforementioned object, it is a further object of this invention to provide new and novel mechanism for mounting the jaws and resiliently urging the jaws into abutting gripping engagement with the tree trunk as the jaws are moved away from the funnel in which the tree was located.

BRIEF DESCRIPTION OF THE DRAWINGS

FIGURE 1 is a side elevation of the apparatus of this invention showing the carriage in solid lines adjacent the front end of the machine and in dotted lines in its rearwardmost position;

FIGURE 2 is a fragmentary plan view of the funnel end portion of the apparatus of this invention, said view being generally taken along the line and in the direction of arrows 2—2 of FIGURE 1;

FIGURE 3 is an enlarged fragmentary transverse sectional view generally taken along the lines and in the direction of the arrows 3—3 of FIGURES 1 and 4 to illustrate portions of the carriage drive and the mounting of the carriage, the clutch operating mechanism being for the most part schematically illustrated;

FIGURE 4 is a fragmentary side view of the front end portion of the apparatus of FIGURE 1, said view being generally taken along the line and in the direction of arrows 4—4 of FIGURE 3;

FIGURE 5 is an enlarged fragmentary plan view of the gripper jaw mounting mechanism and gripper jaws in a datum position, said view being generally taken along the lines and in the direction of arrows 5—5 of FIGURE 1;

FIGURE 6 is an enlarged side view of the structure of FIGURE 5, said view being generally taken along the line and in the direction of arrows 6—6 of FIGURE 6 with the jaw arms and jaws being illustrated in a datum position;

FIGURE 7 is a fragmentary view of the structure of FIGURE 6 to show the maximum jaw spread apart position of the structure illustrated.

Figure 8:
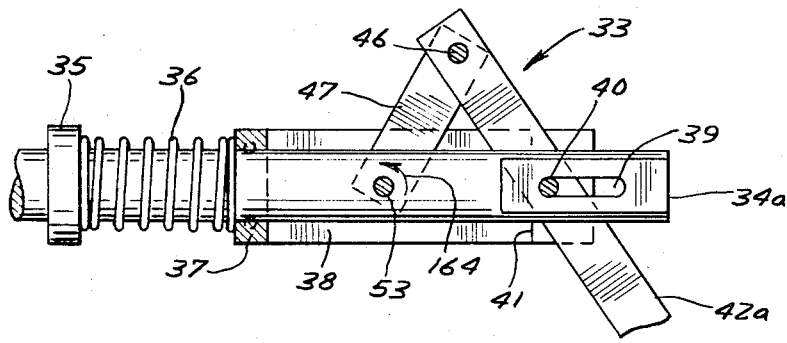
FIGURE 8 is a further enlarged fragmentary cross-sectional view generally taken along the line and in the direction of the arrows 8—8 of FIGURE 5 other than jaw mounting mechanism is shown in a maximum jaw spread apart position.

Referring now in particular to FIGURES 1–4, the Christmas tree loading machine of this invention, generally designated 10, includes a frame having a pair of transversely spaced, longitudinally elongated bottom channels 11, a pair of transversely spaced, longitudinally elongated top frame members 12, front vertical channels 13, rear vertical channels 14, a plurality of pairs of intermediate vertical channels 15, intermediate channels 16, transverse bottom channels 19, and transverse top channels 17 that are connected together to form a generally open boxed type frame. A wheel assembly 22 is mounted by the longitudinal midportions of channels 11 while a trailer hitch assembly 28 is connected to the front end portion of the frame to permit towing. A stand 24 is pivotally mounted at 30 by the assembly 28 to hold the front end of the frame in an elevated position and alternately being pivoted to a retracted position. A pin (not shown) is provided for retaining the stand in either of its positions.

Mounted on the top transverse channels 17 to extend thereabove, and located transversely intermediate top frame members 12 are a pair of parallel support members 18 that extend the longitudinal length of the frame. On one of the support members 18 there is bolted a rail 20 while on the other support member there is bolted a rail 21, each rail having a lower horizontal leg secured to the respective support member. The rails 20 and 21 extend longitudinally and have upper horizontal legs that extend inwardly toward one another whereby the transverse spacing between the upper legs is substantially less than the transverse spacing between the lower legs.

Mounted on the rails 20, 21 for reciprocal movement therealong is a carriage having a pair of transversely spaced, L-shaped plates 23. The horizontally elongated legs 23a of plates 23 extend to both higher and lower elevations than the upper legs of the rails. At both the forward and rearward end portions of legs 23a there is provided an upper transverse roller mount 27 that extends transversely outwardly of said legs, which at each end portion rotatably mounts a roller 25 to ride on the upper leg of the respective rail 20, 21. Vertically beneath each upper roller mount there is provided a corresponding lower roller mount 27 having on each of its end portions, a lower roller 26 rotatably mounted to bear against the under surface of the upper leg of the respective rail 20, 21.

Plates 23 each include a forward, upwardly extending leg 23b, a longitudinally elongated U-shaped channel 29 having its forward end portion extended between legs 23b and welded to the upward end portions thereof. Channel 29 extends a substantial distance longitudinally rearwardly of plates 23 and is located at a substantially higher elevation than the legs 23a.

Referring now to FIGURES 5–7, the gripper jaw and gripper jaw mounting mechanism, generally designated 33, will now be described. To the rearward end portion of the web of the channel 29 there is welded the front end portion of a longitudinally elongated, horizontal shaft 34 that extends a substantial distance rearwardly of said channel. On the forward intermediate portion of the shaft there is mounted a collar 35 in a fixed position, one end of a coil spring 36 on the shaft bearing against the collar and the opposite end bearing against the block (gripper guide) 37 that is slidably mounted on the shaft by the shaft extending through a central aperture of said block. To each of the vertical transverse edges of the block 37 there is bolted the rearward end of a horizontally elongated guide bar 38.

Opposite side portions of the rearward end of the shaft are cut away to provide a narrow transverse width end portion 34a, a horizontally elongated slot 39 being provided in portion 34a. A transverse guide pin 40 is slidably extended through slot 39 and mounted by the forward end portions of guide bars 38, the guide pin also being extended through apertures (not shown) in the jaw arm 42 and the block 41 that is welded to the adjacent guide bar 38. The guide pin is also extended through the jaw arm 43 that is located on the transverse opposite side of shaft portion 34a from arm 42 and the block 41 that is welded to the other guide bar 38.

Each of the jaw arms 42, 43 includes a front arm portion 42a, 43a respectively and a rear arm portion 42b, 43b respectively that is attached to the generally rearward end of the respective front arm portion. The forward end of arm portion 42a is pivotally connected by a pivot pin 46 to the rearward end of a gripper link 47 while the forward end of arm portion 43a is pivotally connected by a pivot pin 51 to the rearward end of the gripper link 52. The forward ends of the gripper link extend along transverse opposite sides of the shaft with one gripper link being located between one guide bar 38 and the shaft 34 and the other gripper link extending between the other guide bar and the shaft.

A transverse pivot pin 53 is retained in an aperture on the shaft horizontally intermediate collar 35 and notch 39, and pivotally mounts the forward end portions of the gripper links 47, 52; pin 53 being located between guide bars 38, but not attached thereto. As may be noted from FIGURE 6, the links 47, 52 and arms 42, 43 are mounted whereby pivot member 46 is located at a higher elevation than the guide bars 38, and the pivot member 51 at a lower elevation than said guide bars. Thus, arm portions 42a, 43a rearwardly of the pivot axis of pivot pin 40 extend at opposite acute angles to the horizontal plane of the pivot axis of said pin to diverge from said plane in a rearward direction; while the rearward arm portions 42b, 43b are joined to the forward arm portions to respectively in a rearward direction converge toward said plane. When the arms are in their datum position of FIGURE 6, the rearward ends of arm portions 42b, 43b are substantially spaced from one another, the rearward end of arm portion 42b mounting a jaw plate 57 that is inclined upwardly in a forward direction. The rearward end of arm portion 43b mounts a jaw plate 58 that is inclined downwardly (for example about 50°) in a forward direction at an angle substantially equal, but opposite to the angle of inclination of the jaw 57. Thus, the rearward end portions of the jaws 57, 58 (portions most closely adjacent the funnel 74) are more widely spaced than at their forward end portions. The jaws have generally planar adjacent inclined surfaces that are of substantial width and inclined length. The upper, horizontal edge of plate 57 is beveled at an acute angle with the generally planar surface thereof to form a sharp edge 57a that is adjacent plate 58; while the lower generally horizontal edge of plate 58 is cut away at an acute angle with the general planar surface thereof to form a sharp edge 58a that is adjacent edge 57a.

Attached to the rear uprights 14 to extend rearwardly thereof are a pair of transverse plates 73, the frusto conical portion 74a of the funnel 74 being mounted on plates 73 (see FIGURE 1). The funnel also has a reduced diameter portion 74b that is secured to the minor base end of portion 74a to extend forwardly thereof at a higher elevation than the rails 20, 21. Portion 74b is retained at a sufficiently high elevation that the legs 23b of the carriage may move to the forward end portion thereof; and the central axis of the funnel is located at an elevation that is transversely between jaws 57, 58 vertically at about the same elevation as the central axis of shaft 34; and transversely centered relative plates 23 and rails 20, 21. A platform 75 is pivotally connected at 79 to plates 73 to be moved between a horizontal condition extending rearwardly of the funnel and a folded up position abutting against the major base end of funnel portion 74a.

In order to move the carriage between a position at least partially beneath funnel 74 and a position at the front portion of the machine, there is provided a rear idler shaft 76 that is rotatably mounted by bearing members 77, members 77 in turn being dependently secured to the top frame members. A chain sprocket 78 is mounted on shaft 76.

A carriage drive sprocket 80 is keyed to front shaft 81, shaft 81 in turn being rotatably mounted by bearing members 84 that are dependingly secured to the top frame members 12 a short distance rearwardly of the front uprights. A chain 82 is extended around sprockets 78, 80 and has one end of its upper run pivotally connected to a mounting member 83 and an opposite end pivotally connected to the other end of said mounting member. Mounting member 83 in turn extends between, is secured to legs 23a longitudinally intermediate the front and rear carriage rollers, and aids to retain said legs in transverse spaced relationship. In order to prevent the carriage rolling off the forward ends of rails 20, 21, a transverse top bracket 86 is bolted to rails 20, 21 while the rearward movement of said carriage is limited by a stop bracket 85 mounted on said frame members in a position to prevent the legs 23b of the carriage striking the funnel. Upper and lower chain guides 103, 104 for chain 82 are mounted on the frame longitudinally intermediate shafts 76, 81.

In order to drive shaft 81 in one angular direction, a sprocket 88 is rotatably mounted on shaft 81 intermediate sprocket 80 and one frame member 12; while in order to drive the shaft in the opposite angular direction, a sprocket 87 is rotatably mounted on shaft 81 transversely between the opposite frame member 12 and the sprocket 80. A clutch member 89 is mounted on shaft 81 intermediate sprockets 80, 88 to rotate with said shaft but not relative thereto; clutch member 89 being axially movable on said shaft to have the teeth thereof (not shown) for drivingly engaging mating teeth (not shown) of sprocket member 88. Likewise clutch member 90 is mounted on shaft 81 intermediate sprockets 80, 87 to be transversely moved between a position drivingly engaging sprocket 87 and a position out of driving engagement therewith.

In order to drive the sprockets 87, 88 motor 92 is mounted on a plate 93, plate 93 in turn being mounted by bottom channels 11 (see FIGURE 4). Motor 92 is drivenly connected by a chain 94 to the drive sprocket 95 of the reversing gear box generally designated 96. Box 96 is mounted on plate 91 which in turn is mounted on channels 11. Sprocket 95 is mounted on transversely elongated shaft 97 for rotation independent thereof, shaft 97 having one end portion mounted within the reversing gear box housing 98 and an opposite end portion rotatably mounted by a bearing mount and bearing mount bracket (not shown) that is mounted on plate 91. A small diameter sprocket 100 is keyed to shaft 97. A chain 101 drivingly connects sprocket 100 to sprocket 88.

The housing 98 has a second driven shaft 105 extending outwardly therefrom in a direction opposite shaft 97, a small diameter sprocket 106 being keyed to shaft 105 to through chain 107 drive sprocket 87. Shafts 97, 105 are constantly driven in opposite directions by gears (not shown) in housing 98, said gears in turn being driven by an annular member (not shown) that surrounds shaft 97 and is drivenly connected to the sprocket 95. The structure of the reversing gear box will not be further described since it is a conventional stock item sold under the name "Speed Changer" Model 22, and manufactured by Hub City Iron Company, Aberdeen, S. Dak.

In order to operate the clutch members 89, 90, between the neutral position, a position clutch 89 through sprocket 88 drives shaft 81, and a position clutch 90 through sprocket 87 drives shaft 81, there is provided the clutch operating mechanism that includes a pair of lugs 146 that are extended into the annular groove of clutch member 89 and mounted diametrically opposite one another for transverse movement by the clutch operating linkage schematically indicated by box and dotted lines 145. A second set of diametrically spaced lugs 146 are mounted by linkage 145 to extend into the annular groove of clutch member 90. The linkage 145 is connected to a hand operating lever 147 that is mounted on the frame adjacent the funnel by a pivot member 148 for pivotal movement between the solid line position illustrated in FIGURE 3 to a position indicated by dotted line position 149 and a third position indicated by dotted line position 150. The linkage 145 and the mounting of hand lever 147 have been described in detail in our aforementioned copending application and therefore the structure thereof will not be further described. Also the clutch linkage includes means operated by the bracket 151 which is attached to the carriage to automatically discontinue the drive to the carriage as the carriage approaches and is adjacent the funnel and when the carriage moves adjacent to bar 86. However, since the above mentioned means is described in our copending application, and in order to simplify the description of the invention, the structure thereof will not be further set forth.

The structure of the apparatus of this invention having been described, the operation thereof will now be set forth. In using the apparatus of this invention, a supply of plastic, tubular open mesh netting 154, for example "Vexar," proprietary name of E.I. du Pont de Nemours and Co., is placed on the reduced diameter portion of the funnel. Such a supply of netting may be of a continuous length, sufficient for, for example, sixty trees. The trunk end of the tree 155 is inserted into the frusto conical portions 74a and moved toward and into the reduced diameter portion. Then, the hand crank 147 is pivoted in the direction of arrow 156 to position 149, i.e. sufficiently that the linkage 145 moves lugs 146 to shift clutch members 89, 90 in the direction opposite arrow 157 whereby clutch member 89 is brought into driven engagement with sprocket 88. As a result, shaft 81 is driven in the direction opposite arrow 158 whereby chain 82 moves the carriage and the mechanism thereon in the direction of arrow 159 toward the funnel. In this connection, the jaws in a datum position are located vertically spaced on either side of the central axis C—C of the funnel.

As the carriage approaches the funnel, the gripper mechanism is moved into the reduced diameter portion of the funnel toward the tree trunk, assuming the tree trunk does not extend forwardly of the funnel, to bring the gripper jaws into abutting engagement with the forward end of the tree trunk. As the gripper jaws move into the funnel, either one or both of the jaws are brought into abutting contact with the forward end of the tree trunk whereby, if the trunk initially only strikes jaw 57, due to the angle of inclination of jaw 57, the tree trunk will be deflected upwardly until about even pressure is exerted against the tree trunk by both of the jaws. After the initial engagement of one or both of the jaws with the tree trunk, the continued rearward movement of the carriage and the resistance to rearward movement of the jaws resulting from the tree trunk abutting against the jaws, exerts a pressure on the jaws that tends to move jaw 57 downwardly and jaw 58 upwardly whereby, for example, jaw 57 is pivoted in the direction of arrow 162 about pivot 40 and also at the same time forces the pivot pin 40 to remain in a substantially stationary longitudinal position as the shaft 29 continues to move rearwardly. As a result, the pivot member 40 effectively moves to the forward portion of the slot. The aforementioned movement of the pivot member 40 and the pivotal movement of the jaw arms at about the pivot member results in pivot members 46, 51 being oppositely moved to positions more remotely spaced from bars 38, and being pivoted in opposite directions about pivot member 53. As a result, the jaws spread apart to permit the sharp edge portions of the jaws passing over the tree trunk. Further, due to the rearward movement of the shaft 29 relative pivot member 40, the shaft also moves rearwardly relative the guide bar 38 and block 37 and thereby the spring 36 is compressed. After the jaw edges 57a, 58a have moved a distance rearwardly of the tree trunk, the movement of the carriage is stopped by, for example, pivoting the hand lever in the direction opposite arrow 156 to its neutral solid position of FIGURE 3 whereby the lugs 146 move the clutch members in the direction of arrow 157 to the clutch member neutral position illustrated in FIGURE 3. This results in a drive connection between sprocket 88 and clutch member 89 being broken and the carriage coming to a stop.

In the event that the tree had not been sufficiently pushed into the funnel to permit the aforementioned spreading action of the jaws taking place, the tree is moved forwardly such that the trunk forces the jaws to their spread apart position to have the sharp edges extend along diametrically opposed surfaces of the tree trunk. That is, in moving the tree forward in the funnel, the tree trunk abuts against the inclined surfaces of the jaws to exert a force against the jaws to pivot, for example, jaw 57 in the direction of arrow 162 about guide pin 40, and to force guide pin 40 forwardly in the slot 39 in the direction of arrow 160. The force acting on the jaws to pivot about the pin 40, moves the pivot pins 46, 51 to pivot away from guide bars 38. The above mentioned pivotal movement of for example pin 46, which is in the direction of arrow 164 about pin 53, through link 47 also results in pin 40 being moved in slot 39 in the direction of arrow 160. Thus, even if only a downward force were exerted on jaw 57, both jaws, within the limits of the length of slot 39, would move forwardly and further apart from one another equal distances relative the extension of the horizontal center axis of shaft 34.

In either event, with the tree trunk between the jaws and the carriage stopped and no movement of the tree trunk, the spring 36 urges the guide bars 38 and pin 40 rearwardly in the direction of arrow 159 (but not pin 53) to urge the jaws into gripping engagement with the tree trunk.

After the tree trunk has been grippingly engaged by the gripper mechanism, the operator pulls the terminal end of the netting 154 in the direction of the arrow 160 to extend beyond the funnel and moves the hand lever 147 in the direction opposite arrow 156 to position 150 whereby through clutch linkage 145, the lugs 146 are moved in the direction of arrow 157 from the solid line position illustrated in FIGURE 3. This results in the clutch members 89, 90 being moved in the direction of arrow 157 whereby clutch member 90 is moved into driven engagement with sprocket 87. As a result, shaft 81 is driven in the direction of arrow 158 whereby the carriage is moved to its forward end of the frame.

Due to the bevel of the jaws providing jaw edges 57a, 58b, as the carriage moves forward and the frictional drag of the tree to movement through the funnel, a force acts on the jaws to resist the movement of the jaws in the direction of arrow 160 along with the carriage. This urges and results in the shaft moving further in the direction of arrow 160 than pin 40, i.e. pin relatively moves rearwardly in slot 39. Through the provisions of links 47, 52, the jaws are moved more closely adjacent one another to bite more deeply into the trunk. Thus, the greater the frictional resistance to the movement of the tree trunk through the funnel, the more deeply the jaws bite into the trunk as the carriage moves forwardly. Further the spring force of the compressed spring 36 also resiliently urges the guide bars 38 and pivot member 40 in a rearward direction relative shaft 34 that urges the jaws 57, 58 more closely adjacent one another which enhances the gripping action. Accordingly, the forward movement of the carriage pulls the tree to the frusto conical portion 74a to compress the tree branches.

As the branches are initially pulled through the forward end of the funnel portions 74b, the operator holding the forward terminal edge of the netting 154 grips the forward branch of the tree with the same hand and thus as the tree is moved forwardly, pulls the netting over the tree. As a result, netting surrounds the branches of the tree as the branches are moved forwardly of the funnel and prevents the branches from spreading out to their normal position. After the top of the tree has been pulled through the reduced diameter portion of the funnel, the hand lever is again pivoted to its neutral position (solid line position of FIGURE 3) whereby the drive of the carriage is terminated. Thereafter, the netting is clipped at the top of the tree and the netting tied. Now the hand lever is moved whereby the clutch member 90 is again brought into driven engagement with sprocket 87 to move the carriage forwardly. After the carriage is moved adjacent the forward end of the frame, the hand lever is again pivoted to its neutral position which results in lugs 146 moving the clutch members 89, 90 in the direction opposite arrow 157 to the solid line position of FIGURE 3. Accordingly, the drive to the carriage is stopped. The stop bracket 86 is provided at the forward end of the machine to prevent a substantial flow of movement of the carriage resulting from inertia.

After the carriage is stopped, the operator pushes downwardly on the tree to spread the jaws sufficiently to remove the tree trunk from between the gripper jaws, the the gripper jaws then, through the action of spring 36, returning to their datum position of FIGURE 6.

It is to be understood that if the automatic clutching feature of our previously mentioned copending application were provided, it would not be necessary to manually operate the hand lever to its neutral position when the carriage has been moved to the forward end of the frame and more rearwardly to a position closely adjacent the funnel such as the position illustrated in dotted lines in FIGURE 1.

The embodiments of the invention in which an exclusive property or privilege is claimed are defined as follows:

1. Apparatus for radially compressing the branches of a tree for a packaging operation comprising a longitudinally elongated frame having a front end portion and a rear end portion, a funnel mounted on the rear end portion of the frame to extend thereabove for having a tree passed therethrough with the tree trunk extending forwardly, said funnel having a central axis and a reduced diameter portion extending longitudinally toward said front end portion, elongated guide rails mounted on the frame to extend from adjacent said front end portion to adjacent said reduced diameter portion, a carriage mounted on said rails for reciprocal movement between a first position adjacent said front end portion, and a second position adjacent said reduced diameter portion, a pair of jaws for grippingly engaging the tree trunk, first means mounted on said carriage to extend rearwardly thereof for retaining the jaws in a datum condition when the jaws are remote from the tree, spreading said jaws from their datum position to a second position to engage transverse opposed surfaces of the tree trunk as at least one of the jaws is moved rearwardly relative the tree trunk into abutting engagement therewith, and moving said jaws into gripping relationship with the tree trunk as the carriage moves forwardly with the tree trunk therebetween, said first means mounting and retaining the jaws at an elevation and in alignment with the funnel for movement thereinto as the carriage moves rearwardly adjacent to the funnel, and power means on the frame for moving said carriage from adjacent the funnel to adjacent the frame front end portion.

2. The apparatus of claim 1 further characterized in that each of said jaws has a generally planar surface, and that said jaws are mounted on the first means to have their planar surfaces converge toward one another in a forward direction when the first means retains the jaws in the datum position.

3. The apparatus of claim 2 further characterized in that each jaw has a transverse sharp edge adjacent the other jaw.

4. The apparatus of claim 1 further characterized in that said first means includes a horizontally elongated mounting member having a first end portion fixedly mounted on said carriage and a second end portion extending rearwardly of said member first end portion, second means mounted on said mounting member for moving the jaws for movement between the jaws datum position and the jaws second position, and third means connected to the mounting member and to the second means for moving the second means to move jaws from their datum toward their second position when a relative forward force is exerted on at least one of the jaws.

5. The apparatus of claim 4 further characterized in that the second means includes an elongated jaw arm for each jaw, each jaw arm having a rearward end portion mounting the respective jaw and a forward end portion, and fourth means mounted on the mounting member for limited slidable movement in a horizontal direction for connecting said jaw arms forwardly of their rearward portions to pivot about a transverse axis.

6. The apparatus of claim 5 further characterized in that said mounting member rear portion has a longitudinally elongated slot and that said fourth means includes a transverse pivot member slidably mounted in said slot and pivotally connecting said arms.

7. The apparatus of claim 6 further characterized in that said third means includes a pair of elongated links having first end portions pivotally connected together and to the mounting member forwardly of said slot and opposite end portions, means for pivotally connecting one link opposite portion to one arm longitudinally forwardly of said slot and outwardly of said mounting member in one direction, and means for pivotally connecting the other link opposite end portion to the other arm longitudinally forwardly of said slot and outwardly of said mounting member in a direction opposite said one direction.

8. The apparatus of claim 7 further characterized in that said first means includes resilient means mounted on the mounting member for constantly resiliently urging the fourth means toward the funnel.

9. The apparatus of claim 7 further characterized in that said mounting member rear end portion comprises a shaft having a front end portion and a rear end portion, said shaft rear end portion having said slot, said fourth means including a guide member longitudinally, slidably mounted on said shaft rear end portion, and a pivot member longitudinally slidably movable in said slot for pivotally connecting said jaw arm front portions, said pivot member being connected to said guide member to move therewith, and that the first means includes means mounted on said mounting member for resiliently urging the guide member to move in a forward direction.

10. The apparatus of claim 9 further characterized in that each jaw front end portion rearwardly of said pivot member in the jaw datum position extends rearwardly in diverging relationship to the other jaw front end portion and that each jaw includes a jaw plate connected to the respective jaw arm rear terminal end portion to in a forward direction, converge toward the central axis of the funnel and toward the other jaw member.

11. Apparatus for radially compressing the branches of a tree for a packaging operation comprising a longitudinally elongated frame having a front end portion and a rear end portion, a funnel mounted on the rear end portion of the frame to extend thereabove for having a tree passed therethrough with the tree trunk extending forwardly, said funnel having a central axis and reduced diameter portion extending longitudinally toward said frame front end portion, elongated guide rails mounted on the frame to extend from adjacent said frame front end portion to adjacent said reduced diameter portion, a carriage mounted on said rails for reciprocal movement between a first position adjacent said frame front end portion, and a second position adjacent said reduced diameter portion, first means mounted on said carriage to extend rearwardly thereof for pulling a tree through said funnel as the carriage is moved from adjacent said reduced diameter portion toward said frame front end portion, said first means including a mounting member mounted on the carriage to extend horizontally rearwardly, a pair of elongated jaw arms each having a front end portion and a rear end portion, each arm portion having a first end and an opposite second end, each arm front end portion second end being joined to the respective arm rear portion first end transversely offset from a line through the arm front end portion first end and the rear portion second end, second means mounted on the mounting member for mounting the arms to extend rearwardly thereof for movement between a datum position with the arms rear portions first ends more remotely spaced than the arms rear portions second ends and a second position that the arms rear portions second ends are more remotely spaced than in their datum positions, means mounted on the mounting member for resiliently urging the second arm mounting means to move the jaws arms to their datum positions and first and second jaw means mounted on respective arms rear portions second ends for cooperatively grippingly engaging a tree trunk as the arms move toward their datum position and a tree trunk is located between said first and second jaw means, said second arm mounting means mounting the arms in position to extend into the funnel reduced diameter end portion when the carriage is adjacent the funnel, and power means on the frame and connected to the carriage for moving the carriage from adjacent the funnel to adjacent the frame front end portion.

12. The apparatus of claim 11 further characterized in that said mounting member includes a rearward, horizontally extending shaft, and that said second arm mounting means includes third means mounted on said shaft for limited longitudinal movement for mounting said jaw arms for both limited pivotal and longitudinal movement as the jaw arms are moved between their positions, and fourth means connected to the mounting member and to the jaw arms for pivoting said jaw arms between their positions as the third means is horizontally moved relative the shaft.

13. The apparatus of claim 12 further characterized in that said shaft has a longitudinally elongated slot, and that said third means includes a guide member slidably mounted on the shaft, a transverse pivot member mounted on the guide member for movement therewith, extended through said slot and pivotally mounting the arms front portions, said resilient means being mounted on said shaft to resiliently urge the guide member rearwardly and thereby the pivot member rearwardly.

14. The apparatus of claim 13 further characterized in that the fourth means includes a pair of links each having one end portions pivotally connected to the mounting member forwardly of said slot to pivot about a common horizontal transverse axis and an opposite end portion, one link opposite end portion being pivotally connected to one jaw arm front portion vertically above the guide member and the other link opposite end portion being pivotally connected to the other jaw arm front portion vertically below the guide member.

15. Apparatus for radially compressing the branches of a tree for a packaging operation comprising a longitudinally elongated frame having a front end portion and a rear end portion, a funnel mounted on the rear end portion of the frame to extend thereabove for having a tree passed therethrough with the tree trunk extending forwardly, said funnel having a reduced diameter portion extending longitudinally toward said front end portion, elongated guide rails mounted on the frame to extend from adjacent said front end portion to adjacent said reduced diameter portion, a carriage mounted on said rails for reciprocal movement between a first position adjacent said front end portion, and a second position adjacent said reduced diameter portion, a pair of jaws for grippingly engaging the tree trunk, a mounting member attached to said carriage to extend rearwardly thereof, a pair of elongated jaw mounting arms each having a rear portion mounting one of said jaws, first means having a transverse axis for mounting said jaw arms to pivotally move the jaws about said transverse axis, second means mounted on said mounting member for mounting said first means and operating said arms to move the jaws from a datum position to a second position more remotely spaced as a tree trunk is relatively moved forwardly relative to a jaw in abutting engagement with said trunk and urging the jaw arms to move the jaws toward one another as the carriage moves forwardly and a tree trunk is between said jaws, said mounting member mounting said first means in a position that the jaw arms mount the jaws at an elevation and in alignment with the funnel for movement thereinto as the carriage moves rearwardly adjacent to the funnel, and power means on the frame for moving said carriage from adjacent the funnel to adjacent the frame front end portion.

References Cited

UNITED STATES PATENTS

| | | | |
|---|---|---|---|
| 2,720,055 | 10/1955 | Morris | 53—124 XR |
| 2,792,775 | 5/1957 | Beyette | 100—13 |
| 2,847,805 | 8/1958 | Robbins | 53—24 |
| 2,974,457 | 3/1961 | Saxton | 53—124 XR |
| 3,135,191 | 6/1964 | Skinner | 53—124 XR |
| 3,358,418 | 12/1967 | Manetta | 53—124 |

BILLY J. WILHITE, *Primary Examiner.*

U.S. Cl. X.R.

53—124; 100—100, 295